United States Patent [19]
Warren

[11] 3,846,819
[45] Nov. 5, 1974

[54] METHOD FOR RECORDING TWO SEPARATE SIGNALS

[75] Inventor: Henry Ray Warren, Indianapolis, Ind.

[73] Assignee: RCA Corporation, New Yok, N.Y.

[22] Filed: June 29, 1970

[21] Appl. No.: 50,646

Related U.S. Application Data

[60] Division of Ser. No. 778,912, Nov. 1, 1968, Pat. No. 3,542,946, which is a continuation-in-part of Ser. No. 627,468, March 31, 1967, abandoned.

[52] U.S. Cl. ............... 360/19, 178/5.4 CD, 360/84, 360/137
[51] Int. Cl. ............................................ H04n 5/78
[58] Field of Search ............. 179/100.2 K, 100.2 T; 360/18, 84, 137

[56] References Cited

UNITED STATES PATENTS

| | | | |
|---|---|---|---|
| 3,070,670 | 12/1962 | Eldridge et al. | 179/100.2 K |
| 3,234,323 | 2/1966 | Kihara | 179/100.2 T |
| 3,283,085 | 11/1966 | Lemke | 179/100.2 T |

*Primary Examiner*—Raymond F. Cardillo, Jr.
*Attorney, Agent, or Firm*—Eugene M. Whitacre; D. E. Pitchenik; W. H. Meagher

[57] ABSTRACT

A system and method is provided for recording both the luminance and color information components of a color television signal in a single track of a magnetic tape. The color components are recorded substantially throughout the magnetizable tape coating, while the luminance component is recorded substantially only in the surface of the magnetizable coating of the tape.

9 Claims, 11 Drawing Figures

INVENTOR
Henry Ray Warren

BY David E. Pitchenik
ATTORNEY

INVENTOR
Henry Ray Warren
BY David E. Fitchenik
ATTORNEY

INVENTOR
HENRY RAY WARREN
BY David E. Petchenik
ATTORNEY

METHOD FOR RECORDING TWO SEPARATE SIGNALS

This is a division of application Ser. No. 778,912, (now U.S. Pat. No. 3,542,946) filed NOv. 1, 1968, which is a continuation-in-part of application Ser. No. 627,468, filed Mar. 31, 1967, now abandoned.

This invention relates to video recording and reproducing apparatus, and more particularly to a method and apparatus for recording and reproducing monochrome and color television signal information in and from a single track of a magnetic tape.

It is known, that in magnetic recording, the magnitude of the applied bias and gap length of the record head determines the depth or penetration of the recording in the magnetic medium. Greater penetrations result when the recording bias is relatively high and the gap length is relaitvely large, and smaller penetrations result when the converse is true.

With the above factors in mind, it has been proposed to optimize the recording of two or more information correlated signals, i.e. signals which are not independent and need not be kept separate, such an audio signal separated into two components containing respective frequency bands of relatively long and short wavelengths, by recording said signals in a single track of a magnetic tape by means of a multi-gap technique. See U.S. Pat. No. 3,012,104 granted to D. Kleis, U.S. Pat. No. 3,070,670 granted to D. F. Eldridge and E. D. Daniel, and a paper by D. F. Eldridge and E. D. Daniel in the I.R.E. Transactions on Audio, May–June 1962, pages 72–78.

However, for recording in a single track of a magnetic tape, two or more time correlated signals, i.e. signals having a time relationship which must be maintained, but in which the information is independent and must be kept separate, such as the monochrome (luminance) and color (chrominance) or the luminance and audio information contained in a television signal, the above references do not solve the various problems associated with the faithful recording and reproducing of such signals.

In particular and with regard to a color television signal, problems such as the generation of beat frequencies caused by the interaction between the relatively high frequencies involved and the overlapping bandwidth of the luminance and chrominance signal components, during reproduction of said signal are prominent.

In prior art attempts to provide apparatus capable of recording a color television signal on a magnetic tape, with the tape being driven at a commerically feasible velocity, it has heretofore been the practice to utilize two or more separate tape tracks to record the color telvision signal, with the monochrome information being recorded in one track and the color information in another parallel track. One of the drawbacks of this type of system is the necessity for two or more distinct tracks.

It is an object of the present invention to provide apparatus for recording and reproducing two or more time correlated signals in a single track of a magnetic tape.

It is another object of the present invention to provide apparatus in which a color television signal is recorded on and reproduced from a single track of a magnetic tape.

It is another object of the present invention to provide a method for improving the signal-to-noise ratio in the recording and playback of both the luminance and chrominance components of a color television signal in and from a single track of a magnetic tape.

It is a further object of the present invention to minimize the possibility of interaction and generation of beat frequencies between the luminance and chrominance information components of a color television signal during the recording and playback thereof from a single track of a magnetic tape.

According to one form of the present invention adapted for use in a television recording, a color television signal to be reocrded is divided into its luminance (monochrome) and chrominance (color) components. Using conventional notation, the chrominance component may be considered to include the color difference signals, as for example, the R-Y, B-Y and G-Y signals. Two of the difference signals are respectively used to frequency modulate separate carrier waves of different frequency which are then added together and applied to a first of a pair of magnetically isolated recording heads arranged for successively scanning the same track of a magnetic tape. The gap length of the first head is large relative to the gap length of the second head and the magnitude or level of the applied signal is such that it is recorded deep into the magnetic coating of the tape. The luminance component is used to frequency modulate another carrier wave of considerably higher frequency than those modulated by the chrominance signals and the resultant frequency modulated signal is then applied to the second smaller gap length head. The gap length of the second head and magnitude or level of the luminance frequency modulated carrier wave signal are such that this signal is recorded substantially only in the surface of the magnetic coating of the tape and in the same track as the previously recorded frequency modulated carrier waves carrying the chrominance signals.

In accordance with an embodiment of the playback portion of the invention, the first and second magnetically isolated recording heads are used to reproduce their respective recorded signals, with the first head reproducing the recorded frequency modulated carrier waves carrying the chrominance signals from the tape record. The frequency modulated carrier wave signal containing the luminance information is reproduced by the second head. The output signals from the first and second reproducing heads are amplified and then applied to suitable F.M. demodulators for the recovery of the chrominance and luminance information from the respective frequency modulated carrier waves in a manner known in the art. The luminance and chrominance information components may then be combined or separately applied to a transmission means or television monitor for viewing as is desired.

In systems of the prior art wherein the television signal chrominance component is recorded on one tape track and the luminance component on another, both the chrominance and luminance components are recorded substantially only in the surface layer of the tape. Assuming a satisfactory signal-to-noise ratio of both the chorminance and luminance components as recorded in the separate tape tracks, upon repeated passage of the tape over the reproduce heads there is a wearing down of the tape surface coating and therefore a degradation of the signal-to-noise ratio of both the chrominance and luminance components recorded therein. This limits the number of times a recorded tape can be played before the reproduced signal is of objectionable quality.

In the system of the present invention, the luminance component is recorded only in the surface layer of the tape, and thus, during playback will suffer the same degradation of signal-to-noise ratio with respect to the tape wear as in the prior art systems. However, since the chrominance components are recorded substantially throughout the thickness of the tape coating, wearing of the tape surface with repeated passage of the tape over the playback head will not produce any signal-to-noise degradation of the chrominance components recorded therein, with respect to tape wear sufficient to produce an unacceptable signal-to-noise ratio for the luminance components. With a wearing or erosion of the tape surface layer, the portion of the tape coating having the chrominance components recorded therein is physically closer to the reproduced heads, and the signal-to-noise ratio of the reproduced chrominance components is actually increased. However, if the signal-to-noise degradation of the luminance channel is due to head magnetization or a physical distortion of the tape surface layer resulting from a burnishing action between the head and tape, then the signal-to-noise ratio of the chrominance component will remain substantially the same. Thus in the above cases, the signal-to-noise ratio of the chrominance components either remains the same or is improved. The net effect is a substantial increase in the number of times the tape can be passed over the reproduce heads and still provide satisfactory reproduction of the recorded signal as compared to prior systems.

In accordance with another feature of the present invention, further improvement in the signal-to-noise ratio is obtained by displacing the first recorded head laterally relative to the second recording head such that the signal applied to the first head is recorded partially in the tape track in alignment with the second head and partially in the normally unused guard band adjacent said tape track.

The novel features which are believed to be characteristic of the invention are set forth with particularity in the appended claims. The invention itself, both as to its organization and method of operation, as well as further objects and advantages thereof, will be better understood from the following description when read in conjunction with the accompanying drawings in which:

FIGS. 1*a* and 1*b* are schematic circuit diagrams in block form showing a system for recording and reproducing a color television signal in accordance with the present invention;

Figure 4:
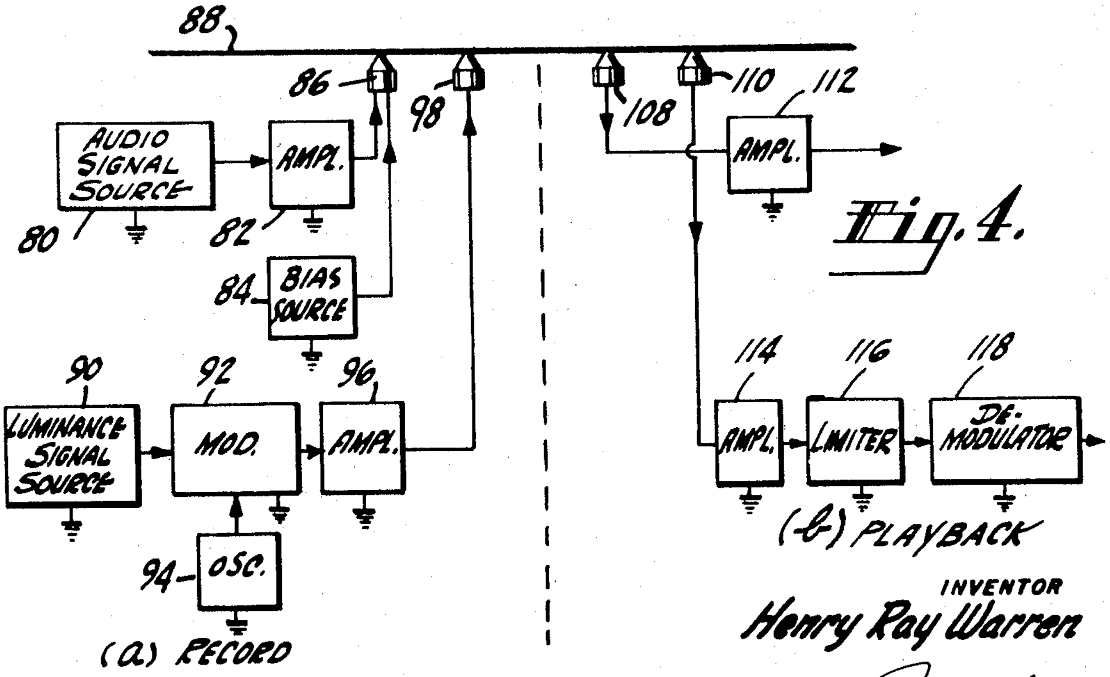
Figure 5:
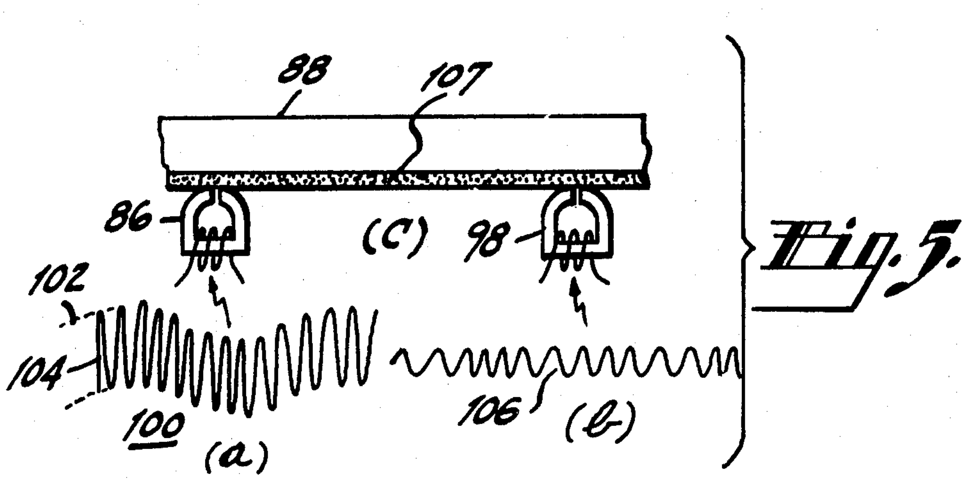
Figure 6:
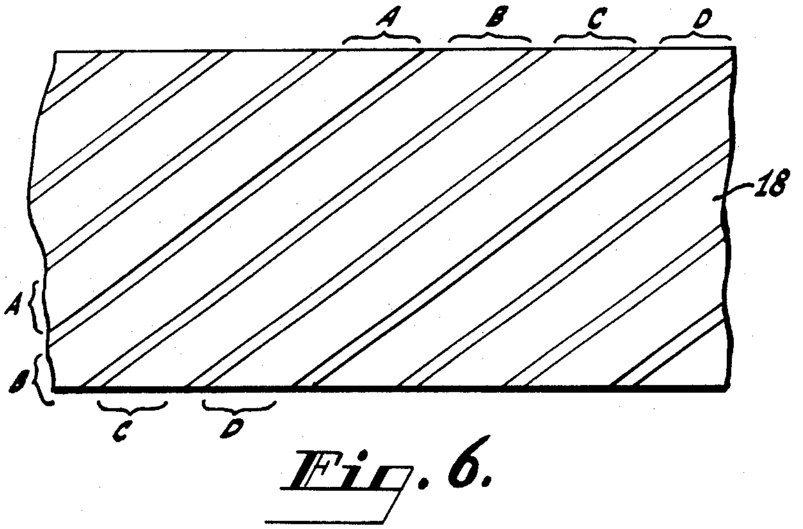
Figure 7:
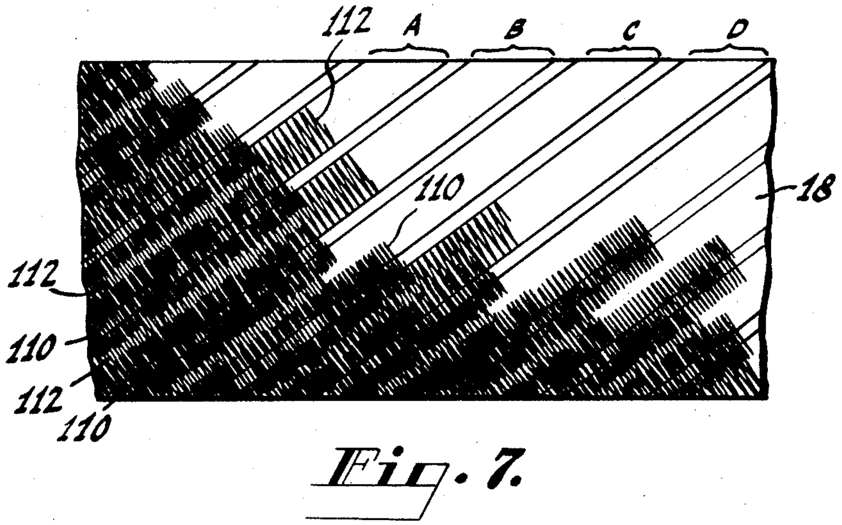

FIGS. 4*a* and 4*b* are schematic circuit diagrams in block form showing another embodiment of a recording and reproducing system in accordance with the present invention;

FIGS. 5*a*, 5*b* and 5*c* are diagrammatic representations of signal waveforms, magnetic tape, and transducer heads useful in the description and understanding of the present invention;

FIG. 6 is a diagrammatic representation of a portion of a magnetic tape illustrating as available for recording thereon several tape tracks and the guard bands provided between the several tracks; and FIG. 7 is a diagrammatic representation of the tape in FIG. 6 illustrating the overlapping and laterally offset arrangement of two signals recorded in accordance with the present invention.

Figure 1:
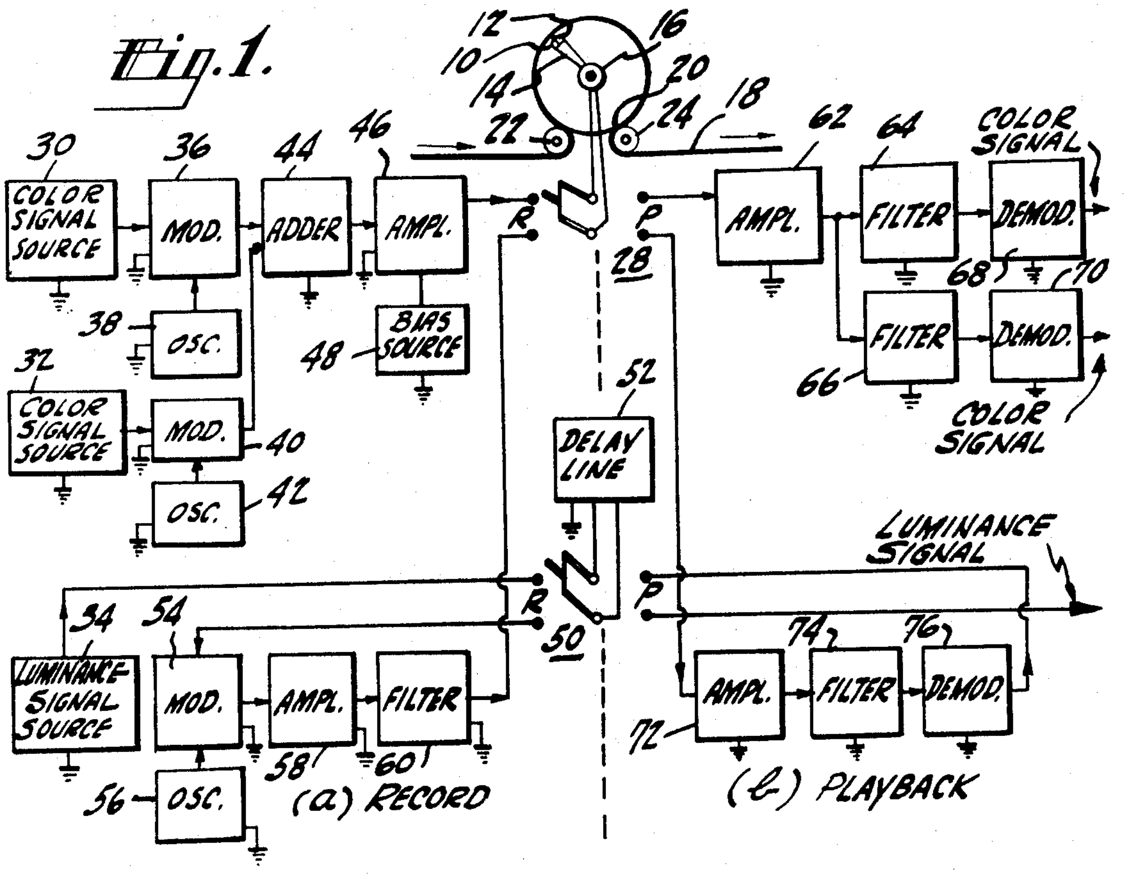

Referring now to the drawings, FIG. 1 shows an embodiment of the system of the present invention. The physical recording head arrangement is diagrammatically represented by a pair of recording heads 10 and 12 which are located at the end of an arm 14 for rotation about a spindle 16. The heads are arranged for helical scanning of magnetic tape 18. A pair of guide members 22 and 24 constrain the tape to follow a helical path around a drum 20 through an angle of almost 360°.

Figures 2, 3:
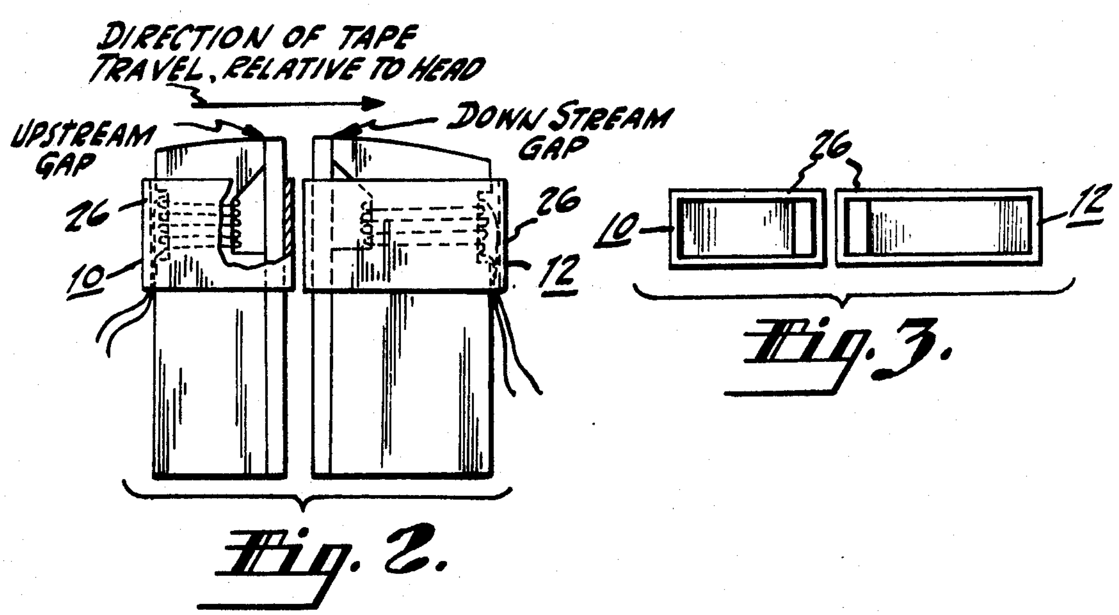
FIG. 2 is a diagrammatic front view of a dual gap recording and reproducing head suitable for use in the systems shown in FIGS. 1*a* and 1*b;*
FIG. 3 is a diagrammatic top view of the head shown in FIG. 2.

The heads 10 and 12, which may be formed as an integral unit, are positioned for successively scanning the same track of magnetic tape 18 and are magnetically isolated from each other by means of shorted copper turns 26 (FIGS. 2 and 3). For ease of description, and since head 10 is positioned to scan the tape prior to head 12, heads 10 and 12 will hereinafter be referred to as the upstream and downstream heads respectively. For reasons to be hereinafter detailed, the heads 10 and 12 may be positioned slightly offset or laterally displaced from one another so that the upstream head partly overlaps the record tape track in alignment or scanned by the downstream head.

A junction control switch 28, (in the record (R) position) is provided to apply the signals to be recorded to the respective heads 10 and 12. When the switch 28 is thrown to the playback (P) position, connection is made between the heads 10 and 12 and their respective signal reproducing circuits.

With reference now to FIG. 1(1), the time correlated signals to be recorded are represented as the outputs of the first color signal, second color signal, and luminance signal sources 30, 32 and 34 respectively. The color sources 30 and 32 may correspond respectively to the R-Y and B-Y color demodulators or matrix amplifiers of a conventional color television receiver and the luminance source 34 may correspond to the video detector of a color television receiver. By way of example, the respective signal sources 30, 32 and 34 may deliver the R-Y, B-Y and Y color difference and luminance components of a color television signal, and will be hereinafter so noted.

For ease of description, the portion of the system shown in FIG. 1(*a*) wherein the R-Y and B-Y components are processed will be hereinafter referred to as the color channel and the portion of the system wherein the luminance or Y component is processed will be referred to as the luminance channel.

It will be understood that in place of either the R-Y or B-Y signal output of the sources 30 and 32, the G-Y component of the detected color signal could be obtained and recorded in the manner to be hereinafter described.

It will be further understood that for color receivers demodulating the color subcarrier on the X-Z axes, I-Q axes or other axes, the color signal sources 30 and 32 may correspond respectively to demodulators or amplifiers providing such color representative signals.

Referring again to FIG. 1(*a*), in the color channel the R-Y signal output of the first signal source 30 is coupled to a modulator 36 where it is used to frequency modulate a first carrier wave supplied from a local oscillator 38 in accordance with known techniques. Similarly, the B-Y signal output of the second signal source 32 is coupled to a modulator 40 where it is used to frequency modulate a second carrier wave supplied from a local oscillator 42. In accordance with the invention, the wavelengths of the first and second carrier waves are different from each other, but both are long relative to the wavelength of a third carrier wave signal utilized in the luminance channel and will hereinafter be described. The frequency modulated carrier wave outputs of modulators 36 and 40 are combined in an adder 44 and then applied to a recording amplifier 46. After amplification, the combined frequency modulated first and second carrier waves (hereinafter referred to as the color modulated carrier waves) are applied, with a suitable bias signal developed in a bias signal source 48, via the function control switch 28 to the appropriate windings of the transducer head 10. The gap length of the head 10, the amplitude of the bias and the amplitude of the color modulated carrier waves are such that the signals penetrate deep into the magnetizable coating of a magnetic tape 18 arranged to pass thereover. As adjusted, the bias signal provides for linearity of the color modulated waves when recorded on the magnetic tape 18 and also provides for erasure of any previously recorded signals on the tape 18. Linearity in the recording of the color modulated waves is necessary to prevent beat signals resulting from the non-linear interaction of the first frequency modulated carrier wave and the second frequency modulated carrier wave.

In the luminance channel, the luminance or Y signal output of the luminance signal source 34 is coupled by means of a switch 50 through a delay line 52 to a modulator 54 where it is used to modulate a third carrier wave supplied from a local oscillator 56. As will be hereinafter described, the delay line 52 provides a means of compensating for the differences in the processing time of the chrominance and luminance portions of the color television signal. Switch 50 allows for the insertion of the delay line 52 in the luminance channel reproducing circuits so as to double the delay obtainable with any given delay line.

The output of the modulator 54 is amplified in a recording amplifier 58, passed through a filter 60, and then coupled via the function control switch 28 to the appropriate windings of the second transducer head 12 arranged in line with the first transducer head 10 such that the tape portion passing across the gap in the head 10 thereafter passes across the gap in the head 12.

For reasons to be hereinafter detailed, filter 60 serves to limit the bandwidth of the modulated third carrier wave to a desired spectrum such that the luminance signal sidebands of the modulated third carrier wave do not extend into the frequency range occupied by the sidebands of the color modulated carrier waves. The gap length of the second head 12 is small relative to the gap length of head 10 and the magnitude of the luminance or Y frequency modulated third carrier wave applied to the head 12 is such that the signal wave only penetrates into the surface layer of the magnetizable tape coating at a depth approximately equal to the gap length of the head 12.

The color modulated waves having been recorded through a relatively long gap (head 10), penetrate deep into the magnetizable coating of the tape. The luminance signal frequency modulated third carrier wave recorded through a relatively short gap (head 12), penetrates into the tape coating an amount substantially less than that of the color modulated carrier waves. Thus only a small portion of the relatively long wavelength color modulated carrier waves are erased during the recording of the luminance signal modulated carrier wave.

It will be noted that instead of frequency modulation, the chrominance and luminance components of the color television signal may be used to phase modulated respective carrier waves. Thus the blocks 36, 40 and 54 in FIG. 1(*a*) may be referred to as angle modulators so as to be representative of either frequency, phase or a combination of frequency and phase modulation circuits.

FIG. 1(*b*) shows a system for reproducing a color television signal recorded as heretofore described and utilizing the record heads 10 and 12. It will be understood however, that different transducer heads may be used to transduce the layer recording in accordance with the teachings of the invention.

FIG. 1(*b*) will be examined considering the switches 28 and 50 in their playback (P) positions.

During playback, the tape is again passed around the drum 20 to provide for helical scanning thereof, with each track containing the recorded chrominance and luminance signal information being successively scanned by the transducer heads 10 and 12 respectively. Thus, the first head 10 may be of any suitable design and has a gap length of sufficient dimension to resolve the relatively long wavelengths of the frequency modulated first and second carrier waves (color modulated carrier waves). This gap length will be too large to effectively resolve the relatively short wavelengths of the frequency modulated third carrier wave signal carrying the luminance information and as such serves to filter the modulated third carrier wave while resolving the color modulated carrier waves.

The output signal from the head 10 is coupled via the function control switch 28 to a playback amplifier 62 where it is amplified and then channeled to the respective input terminals of bandpass filters 64 and 66. Filters 64 and 66 serve to separate the color modulated first and second carrier waves. Thus the output signal from filter 64 corresponds to the frequency modulated first carrier wave and the output signal from filter 66 corresponds to the frequency modulated second carrier wave.

The signal from the filter 64 is fed to an F.M. demodulator 68 in which a color signal corresponding to the R-Y signal is produced. Correspondingly, the signal from the filter 66 is applied to an F.M. demodulator 70 for detection and reproduction of the B-Y signal. If desired, suitable amplitude limiting amplifiers, not shown, may be coupled into the two color signal processing channels prior to the demodulators 68 and 70.

The head 12 has a gap length sufficiently small so as to enable it to resolve the relatively short wavelengths of the frequency modulated third carrier wave. The output signal from the head 12 is coupled via the function control switch 28 to a playback amplifier 72 where it is amplified and then passed through a bandpass filter 74 to insure that only frequencies within the spectrum of the frequency modulated third carrier wave signal are passed on for further processing. The filter 74 can be eliminated by designing the playback amplifier 72 to have a passband response limited to the spectrum of the frequency modulated third carrier wave signal. The amplifier 72 or filter 74 may include means for limiting the amplitude of the passed signal. From the filter 74 the signal is fed to an F.M. demodulator 76 in which a luminance signal corresponding to the originally recorded luminance signal is produced.

It will be understood that for an embodiment in which during recording, phase modulators were utilized in the respective recording of the color and luminance information, then the demodulators 68, 70 and 76 constitute phase demodulators.

Since the color information signal component is carried independently of the luminance information signal component, and since the color information is independent of the luminance information in its frequency content, synchronization between the two signals is important for proper color and luminance registration in the displayed image. Noting that the color and luminance information carrying signals are recorded simultaneously, the reproducing system as above described provides constant timing and synchronization between the two singals so that their registration is kept intact.

It will be understood, that the relatively wide band luminance signal modulated third carrier wave may be processed through the frequency separating bandpass filters in both the recording and playback sections of the above described system with less delay than the narrower band color modulated carrier waves. Thus, before applying the demodulated color and luminance signal components to a display device, as for example, a color picture tube, it will first be necessary to time compensate the luminance signal component by an amount equal to the relative difference between its processing time and the processing time of the chrominance signal components. Compensation may be provided in a variety of ways and at different points in the system. For example, and as previously noted, the luminance component may be delayed prior to recording by passing it through the delay line 52 via the switch 50. Alternatively, suitable delay may be obtained during playback by the insertion of the delay line 52 in series via the switch 50 with the output of the luminance signal demodulator 76. Another alternative would be the combination of the above as is illustrated in FIG. 1, i.e. first delaying the luminance component prior to recording by passing it through the delay line 52 via the swtich 50 and also passing the signal obtained at the output of the demodulator 76 through the delay line 52 via the switch 50. The latter technique has the advantage of doubling the delay obtained with a given delay line and thereby reducing its cost.

In order to illustrated the relationship between the various parameters, i.e. the head gaps, tape speed, coating thickness and frequencies to be recorded and reproduced, let it be assumed that the relative speed between the magnetic tape and the reproduce heads, as for example, in a helical scan recorder, is approximately 1,000 inches per second. The invention is equally applicable to a longitudinal scan recorder when relatively scaled down in frequency.

Using a first carrier frequency for the R-Y signal component of 750 kilohertz, a second carrier frequency for the B-Y signal component of 1.5 megahertz, and a deviation frequency for each carrier of about 100 kilohertz, the shortest wavelength of frequencies in the spectrum of the combined frequency modulated first and second carrier waves (color modulated waves) might therefore be in the order of 650 microinches (wavelength = relative tape speed/frequency). A record and playback head having an effective gap length (including fringing) of approximately 250 to 300 microinches is adequate to record and reproduce these wavelengths. Since the average tape coating thickness of presently available tape is approximately 200 to 350 microinches, a 250 to 300 microinch gap head is also sufficient to allow deep penetration of the color modulated waves into the magnetizable coating of the tape.

Assuming a third carrier wave frequency of about 4.0 megahertz, and wavelength in the order of 250 microinches, a luminance record and reproduce head gap of approximately 40 microinches (less than one-half the wavelength of the third carrier wave frequency) will be satisfactory for recording and reproduction of the luminance signal frequency modulated third carrier wave; the magnitude of the applied signal being adjusted to provide a magnetic flux penetration into the tape coating to a depth approximately equal to the gap length, i.e. 40 microinches as compared to the depth penetration of approximately 200 to 350 microinches by the color modulated carrier waves. The result of the luminance signal frequency modulated carrier wave being recorded on top of the color modulated carrier waves is the erasure by the third carrier wave signal of approximately 40 microinches depth of the 200 to 350 microinches recorded depth of the color modulated carrier waves.

In playback, the relatively large gap head 10 does not resolve the relatively short wavelengths of the frequency modulated third carrier wave, thereby providing a natural filter for this portion of the recorded signal. However, the head gap is sufficiently small to resolve the relatively large wavelengths of the color modulated carrier waves recorded on the tape. As heretofore mentioned, the bandwidth of the recorded luminance signal frequency modulated third carrier wave does not extend down into the range or bandwidth or the combined frequency modulated first and second carrier wave signals (1.6 megahertz). Thus the luminance signal sidebands of the third carrier wave will extend approximately ±2 megahertz from the F.M. carrier of 4 megahertz. If the luminance carrier sidebands extend into the frequency range of the first and second carrier wave sidebands, the luminance carrier sidebands will be resolved by the upstream head 10 and may produce beats which show up in the reproduced picture as distortion.

In recording the color modulated carrier waves, D.C. bias is preferred over A.C. bias in order to prevent excessive heating of the transducer head as well as to eliminate possible heat problems due to the interaction between an A.C. bias frequency and the luminance carrier wave. It should be noted that the A.C. bias frequency should be several times that of the highest frequency sideband, such as 20–25 megahertz.

In the preferred embodiment of the invention as above described with regard to a helical scan recorder, one field is recorded per revolution of the transducer heads. The downstream head gap is spaced from the upstream head gap a distance corresponding to the time it takes to record one horizontal line of the television signal. With a head to tape speed of approximately 1,000 inches per second, the spacing between the transducer head gaps is approximately 63.5 micro-inches. By spacing the downstream head from the upstream head a distance corresponding to one recorded horizontal line (or integral number of horizontal lines), resolution by the upstream head 10 of the lower sidebands of the luminance signal frequency modulated wave corresponding to the sync pulse components, occurs coincidentally with the resolution by the downstream head 12 of the luminance frequency modulated carrier wave containing the sync pulse information of another horizontal line, thus interference due to the upstream head resolving the sync pulse information will not be seen in the reproduced image.

It will be noted that with respect to any point on the tape, information is recorded first by the upstream head and then by the downstream head.

It will be further noted that the layer recording and playback system as above described does not require that the downstream/upstream track, i.e. the single tape track in line with the two transducer heads, by any wider or narrower than if the color and luminance signals are each to be recorded in separate tracks on the tape, as in prior art systems. Thus, the width of a guard band required between two successive tracks having information recorded therein in accordance with the layer system of the invention would be the same as the width of the guard band required between recordings made on two simultaneously scanned tracks as in prior art systems. It will be apparent than, that in accordance with the system of the present invention both the color and luminance signals can be recorded in the same space on a magnetic tape utilized in prior art systems to record only one of said color and luminance signals.

Of course one of the factors to be considered in determing the guard band width requirement in the design of any tape player apparatus is the tracking error of the scanning mechanism of the apparatus, i.e. the ability of the transducer heads to retrace in playback the paths which they followed during recording. For a player apparatus having a 7.0 mil tape track, a guard band of 2.0 mils in width has been found to provide suitable isolation between adjacent tape tracks, assuming the player apparatus utilized therewith has been constructed in accordance with economically practical design tolerances. Thus, for the purposes of the discussion to follow the width of the tape tracks to be referred to will be assumed to be approximately 7.0 mils and the guard path between adjacent tape tracks will be approximately 2.0 mils in width, thereby making the distance between centers of two adjacent tracks approximately equal to 9.0 mils.

With reference again to the drawings, a diagrammatic representation of a magnetic tape providing several recording tracks and associated guard bands is illustrated in FIG. 6 and two independent signals impressed on the tape in FIG. 7. It will be understood, of course, that the magnetizable coating of a magnetic tape is one continuous surface, the discrete track and guard band representations in FIGS. 6 and 7 being for convenience only so as to provide a reference for indicating the positioning of the two transducer heads 10 and 12 relative to the tape 18 passing thereover. It has been found that given a layer recording system as above dscribed, the signal-to-noise ratio of the recorded color modulated carrier wave (hereinafter referred to as the first signal) can be improved by displacing the upstream head relative to the downstream head and passing tape such that the upstream head records partly in two adjacent tracks sequentially scanned by the downstream head and in the guard band between said two adjacent tracks. For example and with reference to FIGS. 6 and 7, a first signal 110 is recorded by the upstream head 10 simultaneously along approximately a 2 ½ mil width of track A, a 2 ½ mil width of adjacent track B, and the 2 mil guard band b therebetween, with the signal penetrating deep into the magnetizable coating of the tape 18. Sequentially recording of the first signal 110 continues along the 7 mil width formed by portions of tracks B and C and the guard band *c* therebetween; tracks C and D guard band *d*, etc. The luminance signal modulated carrier wave (hereinafter referred to as the second signal 112) is recorded by the second or downstream head 12 substantially along the full width of track B and substantially only in in the surface layer of the magnetizable coating of the tape 18 and then sequentially along the full width of tracks C, D and so on. As has already been described in accordance with the layer system of the present invention, the first signal can be recorded along the full width of the track in which an associated second signal is recorded. Thus, it will be seen that in a layer recording system, the displacement of the first signal of the formerly unused guard band area improves the signal-to-noise ratio of the first signal by eliminating some of the erasure effects caused by the second or downstream transducer head during surface layer recording of the second signal over the signal recorded by the first head. Since the first and second signals are each recorded in different thicknesses of the magnetizable tape coating, it will be apparent that the effectiveness of the guard bands between adjacent tracks in magnetically isolating the information recorded in said adjacent tracks is not impaired. In effect there is still a guard band between two adjacent 7 mil track widths having a first signal impressed thereon, and another guard band separating two adjacent 7 mil track widths having a second signal impressed thereon.

Alternatively, the first signal could be simultaneously recorded along a 5 mil width of track A and the 2 mil width of the guard band, with the second signal being recorded along the full width of track A, thereby again utilizing the guard band area between adjacent tracks to minimize the erasure effects on first signals caused by the surface layer recording of the second signal thereover. Other suitable displacement ratios for layer recording of two signals in accordance with the teachings of the present invention may become apparent to those skilled in the art.

Referring now to FIGS. 4*a* and 4*b*, there is shown another embodiment of the system of the present invention. In this example, two time correlated signals to be recorded and reproduced are representative respectively of the audio and luminance components of a television signal.

An audio signal from an audio signal source 80 is amplified in a recording amplifier 82 and then applied with a suitable bias signal developed in a bias signal source 84 to the appropriate windings of a first recording head 86. The gap length of the head 86 and the magnitude of the bias and audio signals are adjusted relative to the frequency spectrum of the audio signal to be recorded such that the signal penetrates deep into the magnetizable coating of a magnetic tape 88 arranged to pass thereover.

A television luminance signal derived from a luminance signal source 90 is coupled to a modulator 92 where it is used to frequency modulate a carrier wave supplied from a local oscillator 94 in accordance with known techniques. The luminance frequency modulated carrier wave is amplified in a recording amplifier 96 and then applied to the appropriate windings of a second transducer head 98 magnetically isolated from and arranged in line with the first or audio transducer head 86 such that the tape portion passing across the gap in the head 86 thereafter passes across the gap in the head 98. The gap length of the second head 98 is small relative to the gap length of head 86 and the magnitude of the luminance frequency modulated carrier wave applied to the head 98 is such that the signal wave penetrates into the outer layer of magnetizable tape coating at a depth approximately equal to the gap length of head 98.

Referring now to FIGS. *5a* and *5c*, there is shown a waveform 100 representative of the combined audio 102 and high frequency AC bias 104 signals applied to the recording head 86. Waveform 106 (FIG. *5b*) illustrates the luminance frequency modulated carrier wave applied to the head 98. As shown in the figures, the magnitude of the signal applied to the head 86 is large relative to that of the frequency modulated carrier wave applied to the head 98. The gap length of the head 86, the amplitude of the bias, and the amplitude of the audio signal are such that the audio signal is recorded deep into the thickness of the magnetizable tape coating 107. As adjusted, the bias signal improves the linearity of the audio signal when recorded on the magnetic tape 88 and also provides for erasure of any previously recorded signals on the tape 88. The tape containing the audio signal then progresses to the second head 98 where a narrow gap consistent with the resolution of the relatively short wave length carrier wave which contains the luminance signal, records the frequency modulated carrier wave 106 in the same track that contains the previously recorded audio signal. The magnitude of the carrier wave signal is adjusted to a low value for optimum recording of short wavelengths so that only a very small portion of the relatively long wavelength or audio information near the surface of the tape is erased during the second recording.

It will be noted that instead of a high frequency AC bias for the audio signal, a DC bias may be applied along with the audio signal to the recording head 86. The magnitude of the DC bias should be adjusted to provide for a linear recording of the audio signal substantially throughout the thickness of the magnetic tape in accordance with known techniques. Thus, the block 84 referred to in FIG. *3a* represents either an AC or DC bias signal source.

FIG. *4b* shows the reproducing portion of the alternate embodiment of the present invention. The magnetic tape 88 containing the impressed audio and luminance frequency modulated signal information is caused to be successively passed over an audio playback head 108 and a luminance playback head 110.

The playback head 108 has a gap length of sufficient dimension to resolve the amplitude variations of the audio portion of the recorded signal into an electrical signal output. Thus, this gap length will be too large to effectively resolve the luminance frequency modulated carrier wave signal and as such serves to filter the carrier wave while resolving the audio signal.

The output signal from the audio playback head 108 is coupled to the audio playback amplifier 112 wherein the signal is amplified and equalized, as necessary, to provide an audio output signal corresponding to the originally recorded signal.

The luminance playback head 110 has a gap length sufficiently small so as to enable it to resolve the luminance frequency modulated carrier wave signal impressed on the tape 88. The output of the luminance playback head 110 is amplified in a luminance playback amplifier 114 and then passed through a suitable limiter circuit 116 wherein any noise or amplitude variations of the signal are removed. From the limiter 116 the signal is fed to an F.M. demodulator 118 in which a luminance signal corresponding to the original recorded luminance signal is produced.

It will be understood that the reproduce heads 108 and 110 may be the same heads used in the recording system of FIG. *2a*, i.e. head 86 and head 98 respectively, provided of course, that the required gap relationship exists between heads 86 and 98 to allow for the resolution of the luminance frequency modulated carrier wave by head 86. By using the same two heads to record and reproduce the separate audio and luminance signals, the original timing relationship between said signals is preserved.

While several specific embodiments of the invention have been illustrated and described, it will be understood that the invention is not limited thereto but contemplates such modification and further embodiments as may occur to those skilled in the art.

What is claimed is:

1. A method of recording two separate signals of respectively long and short wavelength frequency content on a tape record having a magnetizable coating comprising the steps of:

recording the long wavelength frequency signals substantially into the thickness of the magnetizable tape coating and sequentially in a first group of parallel aligned tracks on said tape, adjacent pairs of tracks in said first group being separated by a first guard band therebetween, and then recording the short wavelength frequency signals substantially into the surface layer of said magnetizable coating and sequentially in the second group of parallel aligned tracks on said tape, each of the tracks in said second group encompassing different portions of two adjacent tracks in said first group and the first guard band therebetween, adjacent pairs of tracks in said second group being separated by a second guard band therebetween.

2. A recording method as defined in claim 1 wherein the width of each of the tracks in group 1 and group 2 is substantially equal.

3. A method of recording as defined in claim 1 wherein said long wavelength signals contain color information components of a color television signal and said short wavelength signals contain luminance information of said color television signal.

4. A method of recording two separate signals of respectively long and short wavelength frequency content on a tape record having a magnetizable coating comprising the steps of:

recording the long wavelength frequency signals substantially into the thickness of the magnetizable tape coating and in a first plurality of tracks on said tape, adjacent pairs of tracks of said first plurality of tracks being separated by a guard band; and then recording the short wavelength frequency signals substantially into the surface layer of said magnetizable tape coating, said recording being partially in the magnetizable coating of said guard band separating said first plurality of tracks and partially over said long wavelength signals recorded in said first plurality of tape tracks.

5. A method of recording as defined in claim 4 wherein said short wavelength signals are recorded in a second plurality of tracks on said tape, adjacent pairs of tracks of said second plurality of tracks being separated by a guard band, each guard band separating said second plurality of tracks being on one of said first plurality of tracks.

6. A method of recording as defined in claim 5 wherein available area of said magnetizable coating for said first and second plurality of tracks is filled with a recorded signal to provide complete utilization of the available area of the magnetizable coating.

7. A method for recording as defined in claim 6 wherein said first and said second plurality of tracks are parallel and transverse to the length of said tape.

8. A method of recording as defined in claim 7 wherein said long wavelength signals contain color information components of a color television signal and said short wavelength signals contain luminance information of said color television signal.

9. A method of recording as defined in claim 8 wherein said first and said second plurality of tracks are slanted with respect to the length of said tape.

* * * * *